(12) United States Patent
Evans, V

(10) Patent No.: US 10,129,377 B2
(45) Date of Patent: Nov. 13, 2018

(54) INTEGRATED STRUCTURE INCLUDING IMAGE CAPTURE AND DEPTH SENSING COMPONENTS

(71) Applicant: Essential Products, Inc., Palo Alto, CA (US)

(72) Inventor: David John Evans, V, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/706,528

(22) Filed: Sep. 15, 2017

(65) Prior Publication Data

US 2018/0191879 A1 Jul. 5, 2018

Related U.S. Application Data

(60) Provisional application No. 62/442,334, filed on Jan. 4, 2017.

(51) Int. Cl.
| | |
|---|---|
| *H04N 7/18* | (2006.01) |
| *H04M 1/02* | (2006.01) |
| *H04N 5/33* | (2006.01) |
| *G06T 7/521* | (2017.01) |
| *G03B 13/18* | (2006.01) |
| *G06K 9/20* | (2006.01) |
| *G02B 7/28* | (2006.01) |

(52) U.S. Cl.
CPC .......... *H04M 1/0264* (2013.01); *G02B 7/285* (2013.01); *G03B 13/18* (2013.01); *G06K 9/2018* (2013.01); *G06T 7/521* (2017.01); *H04N 5/332* (2013.01)

(58) Field of Classification Search
CPC .......... G06F 3/01; G06F 3/0346; G06F 3/012
USPC ..................... 348/42–60, 142–160
See application file for complete search history.

(56) References Cited

U.S. PATENT DOCUMENTS 9,778,476 B2* 10/2017 Hazeghi ................ G02B 27/30
2017/0205903 A1* 7/2017 Miller .................. G06F 3/0346

OTHER PUBLICATIONS

International Search Report and Written Opinion dated Jan. 30, 2018 for PCT application No. PCT/US17/67578 of Essential Products, Inc.

* cited by examiner

*Primary Examiner* — Andy Rao
(74) *Attorney, Agent, or Firm* — Perkins Coie LLP

(57) ABSTRACT

A handheld device can include an image capture subsystem and a depth sensing subsystem. The image capture subsystem includes an image capture light source operable to emit visible light and an image capture camera operable to capture an image of a scene illuminated by the visible light emitted by the visible light source. The depth sensing subsystem includes a depth light source operable to emit infrared light and a depth camera operable to capture reflected infrared light, including at least some of the infrared light emitted from the depth light source, after reflecting off objects in the scene. The image capture light source, the depth light source, and the depth camera are housed in a single integrated structure including a single transparent panel through which the visible and infrared light are emitted onto the scene, and through which the depth camera receives the reflected infrared light from the scene.

20 Claims, 7 Drawing Sheets

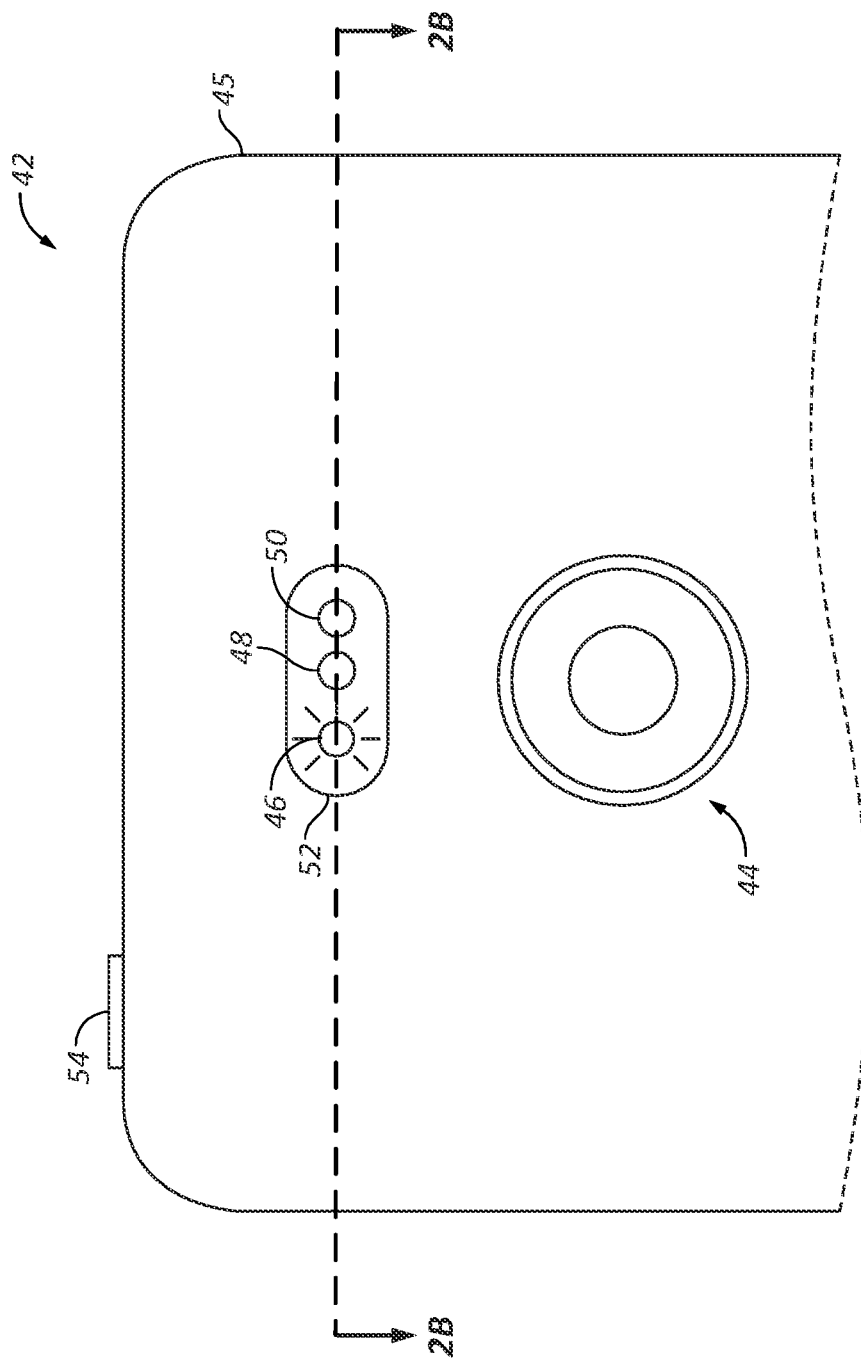

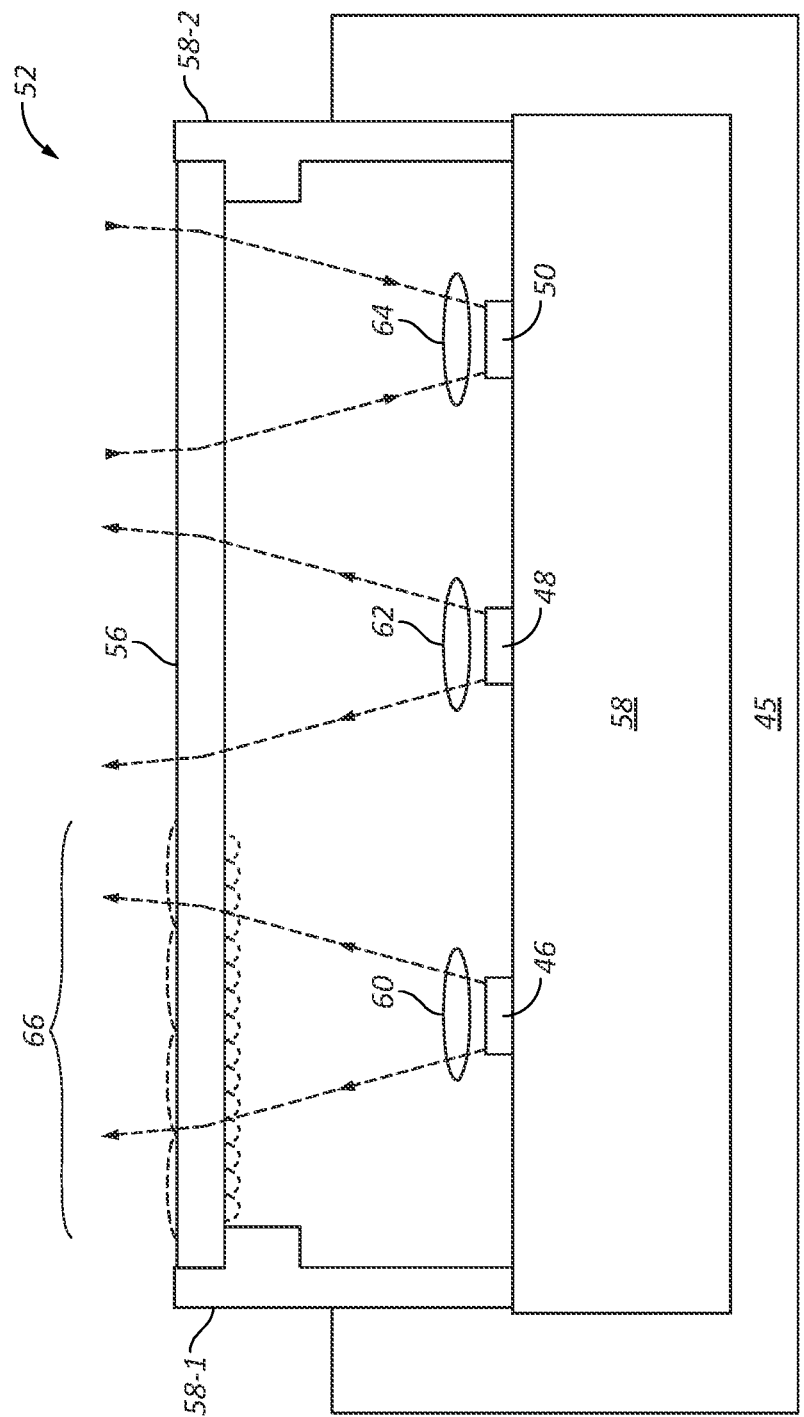

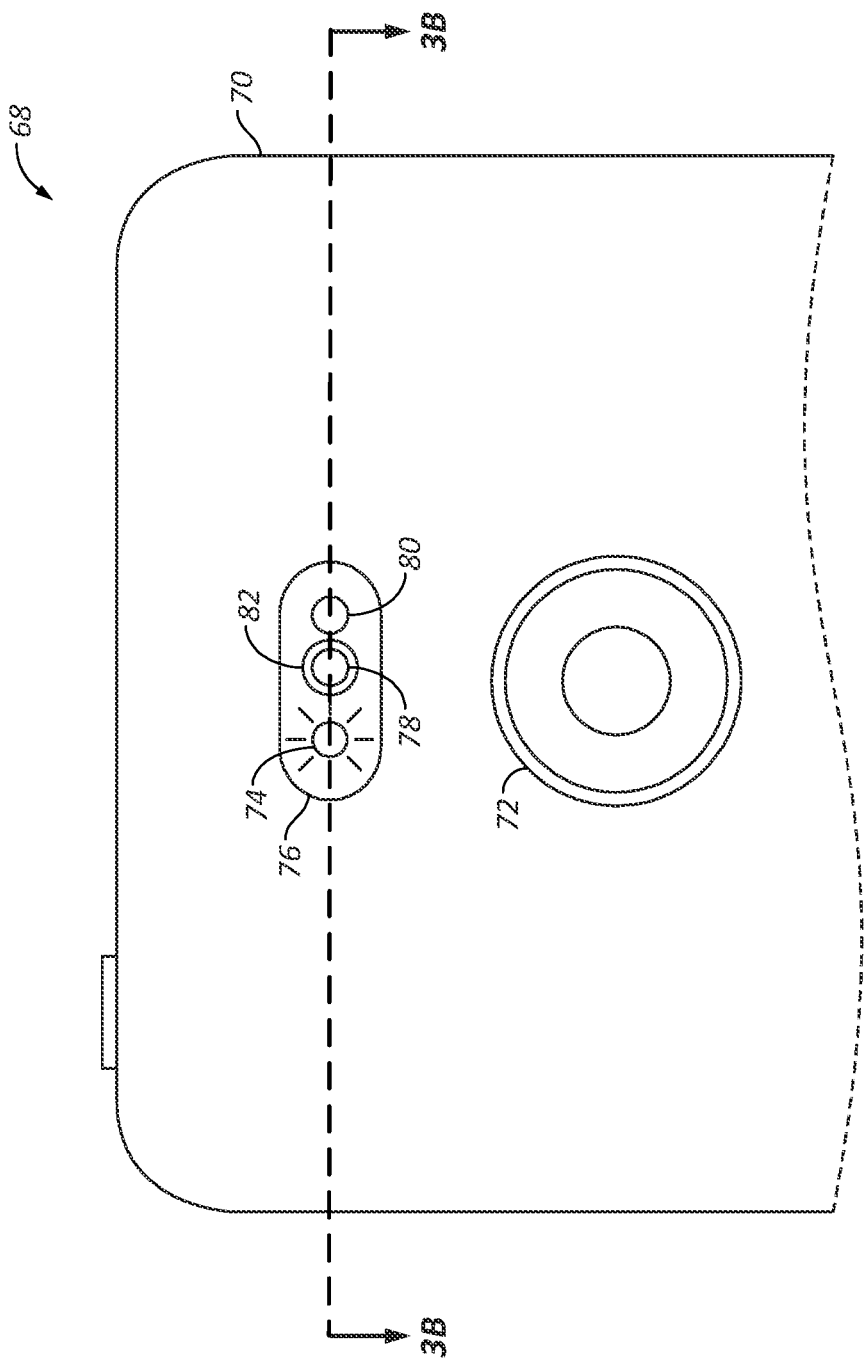

INTEGRATED STRUCTURE INCLUDING IMAGE CAPTURE AND DEPTH SENSING COMPONENTS

CROSS-REFERENCE TO RELATED APPLICATION

This application claims priority to U.S. provisional patent application No. 62/442,334, filed Jan. 4, 2017, which is incorporated herein in its entirety by this reference.

TECHNICAL FIELD

The teachings disclosed herein relate to image capture and depth sensing technologies for electronic devices. More particularly, the teachings disclosed herein relate to components of an image capture subsystem and components of a depth sensing subsystem integrated into a single structure of a handheld device.

BACKGROUND

A handheld device is a small computing device such as a smartphone or wearable device. A typical handheld device includes a combination of complex components that enable a variety of functions. For example, a smartphone can combine features of a personal computer operating system with features of a mobile phone, media player, gaming device, Global Positioning System (GPS) navigation device, and a digital camera. As handheld devices continue evolving to include additional technologies, the combination of electronic components that can be incorporated into the handheld devices is limited by the size of the handheld devices. As a result, handheld devices appear structurally cluttered with cameras, light sources, buttons, scroll wheels, and other appurtenances. For example, a handheld device can include a camera flash used to produce a flash of light that illuminates a scene when capturing an image of that scene. A typical flash generating component is an outward facing bulky structure that is at least partially integrated into an outer casing of the handheld device.

Depth sensing technology can be used to determine the location of the device, including a depth sensor, in relation to nearby objects or to generate a three-dimensional image of the device's environment. An example of depth sensing technology is a time-of-flight (ToF) system. A ToF system includes a light source and a camera. The light source emits light onto nearby objects. Light reflected off the surfaces of the objects can be captured by the camera. The time it takes for the light to travel from the light source and reflect back from an object to the camera is converted into a depth measurement (i.e., distance to the object), which can be processed to map physical surfaces in an environment and, if desired, to render a three-dimensional image of the environment. Although depth sensing technologies can expand the capabilities of handheld devices, depth sensors are bulky structures that further clutter the exterior appearance of the handheld devices. As a result, multi-functional handheld devices can include a combination of separate bulky structures such as a digital camera light source, a light source for a depth sensor, and a camera for a depth sensor, which are at least partially embedded in the exterior casings of the handheld devices. Accordingly, a need exists to expand the capabilities of handheld devices while minimizing the impact of additional bulky structures included in the handheld devices.

SUMMARY

The embodiments disclosed herein include a handheld device that can include an image capture subsystem and a depth sensing subsystem. The image capture subsystem includes an image capture light source operable to emit visible light and an image capture camera operable to capture an image of a scene illuminated by the visible light emitted by the image capture light source. The depth sensing subsystem includes a depth light source operable to emit infrared light and a depth camera operable to capture reflected infrared light, including at least some of the infrared light emitted from the depth light source after it is reflected off objects in the scene. The image capture light source, the depth light source, and the depth camera are housed in a single integrated structure including a single transparent panel through which the visible light and the infrared light is emitted onto the scene, and through which the depth camera receives the reflected infrared light from the scene.

In some embodiments, a single integrated structure can include components of an image capture subsystem and a depth sensing subsystem. The single integrated structure can include a first light source component operable to emit light of a first wavelength through a transparent window, a second light source component operable to emit light of a second wavelength through the transparent window, the second wavelength being different from the first wavelength, and a camera component operable to capture light through the transparent window, wherein the camera is operable to capture light of the second wavelength but not the first wavelength.

In some embodiments, a handheld device can include a single integrated structure at least partially embedded in a casing of the handheld device. The single integrated structure can include a light emitting diode, a diffuser optic, a laser emitting diode, a focusing optic, and a camera. The light emitting diode is operable to emit visible light through a transparent window. The diffuser optic is positioned in an optical path of the visible light emitted by the light emitting diode and is configured to diffuse the visible light emitted by the light emitting diode through the transparent window and onto a scene. The laser emitting diode is operable to emit infrared laser light through the transparent window. The focusing optic is positioned in an optical path of the infrared laser light emitted by the laser emitting diode and is configured to focus the infrared laser light emitted by the laser emitting diode through the transparent window and onto the scene. Lastly, the camera is operable to capture reflected infrared light after reflecting off objects in the scene, including at least some of the infrared light emitted from the laser emitting diode and focused by the focusing optic.

Other aspects of the technique will be apparent from the accompanying Figures and Detailed Description.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2A illustrates a partial view of a handheld device including components of an image capture subsystem and depth sensing subsystem integrated in a single compact structure according to an embodiment of the present disclosure;

FIG. 2B illustrates a cross-sectional view of a single integrated, compact structure of FIG. 2A including components of the image capture subsystem and the depth sensing subsystem according to an embodiment of the present disclosure;

FIG. 3A illustrates a partial view of a handheld device including components of an image capture subsystem and depth sensing subsystem integrated into a single compact structure according to another embodiment of the present disclosure;

DETAILED DESCRIPTION

Figure 1A:
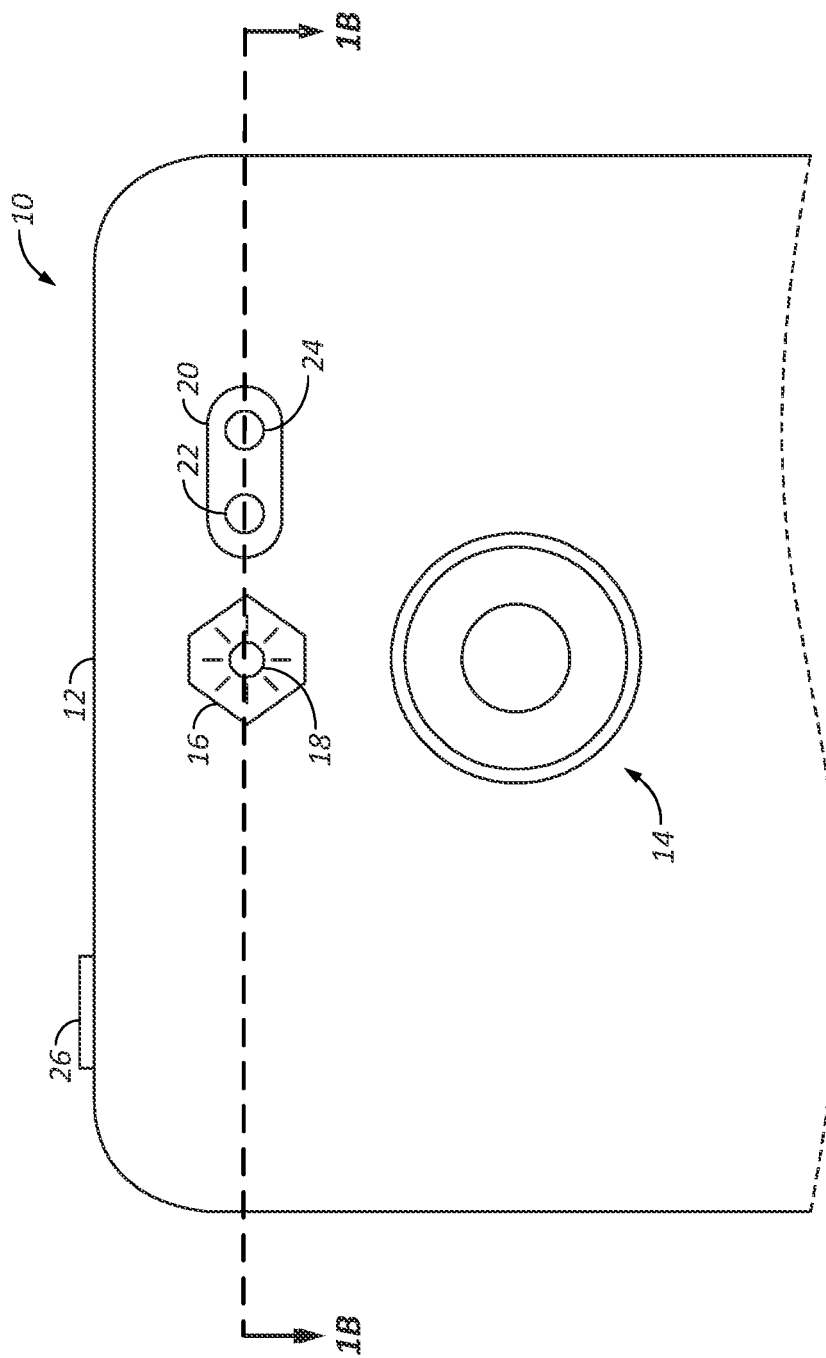
FIG. 1A illustrates a partial view of a handheld device including components of an image capture subsystem and depth sensing subsystem.

The embodiments set forth below represent the necessary information to enable those skilled in the art to practice the embodiments and illustrate the best mode of practicing the. Upon reading the following description in light of the accompanying Figures, those skilled in the art will understand the concepts of the disclosure and will recognize applications of these concepts that are not particularly addressed here. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of an electronic computing device that manipulates and transforms data, represented as physical (electronic) quantities within the computer's memory or registers, into other data similarly represented as physical quantities within the computer's memory, registers, or other such storage medium, transmission, or display devices.

As used herein, the terms "connected," "coupled," or variants thereof, refer to any connection or coupling, either direct or indirect, between two or more elements. The coupling or connection between the elements can be physical, logical, or a combination thereof.

The disclosed embodiments include electronic devices having components of an image capture subsystem (e.g., camera) and components of a depth sensing subsystem included in a single integrated, compact structure that can be incorporated into the electronic devices. The components or a group of components may also be referred to as a module. An example of a component of the image capture subsystem includes a light source such as a flash component operable to illuminate an environment with visible light. An example of a component of the depth sensing subsystem includes a time-of-flight (ToF) sensor that emits infrared (IR) light onto the environment and captures the IR light reflected off surfaces of objects in the environment to determine the spatial relationship of the objects relative to the electronic device. Specifically, the ToF components can include an IR light source and IR light camera. Although integrated into a single, compact structure, the image capture and depth sensing subsystems can still operate independently.

The components of the image capture and depth sensing subsystems can be physically bulky structures that require separate complex assemblies to incorporate into larger electronic devices (e.g., smartphones). For example, the respective light sources of an image capture subsystem (e.g., camera) and a ToF sensor are distinct and separate electronic components that serve different purposes. Specifically, the light source of the image capture subsystem illuminates an environment with visible light to facilitate capturing an image of a scene of that environment. The light source of the ToF sensor emits nonvisible (e.g., infrared) light to facilitate determining the spatial relationship of objects in the environment relative to the ToF sensor. These components are typically incorporated into larger electronic devices as separate structures such that they collectively occupy different portions of the exteriors of the electronic devices, making them appear cluttered with components.

The dimensions of components of the image capture subsystem and depth sensing subsystem may be physically too large (e.g., too bulky) for some applications. These components are bulky in part because they can utilize physically large light sources, have large optical working distances, and can include optical elements that must be integrated into electronic devices. As such, the components of the image capture or depth sensing subsystems are physically bulky and heavy, and may not be usable in certain handheld or wearable applications. Additionally, the components of the image capture or depth sensing subsystems cannot feasibly be combined with automated processes used to assemble certain handheld devices. As a result, processes for manufacturing existing handheld devices to include components of image capture or depth sensing subsystems can be cost prohibitive and result in numerous distinct, bulky structures that are poorly suited for applications such as handheld applications, and are an impediment to further miniaturization of such devices.

FIG. 1A illustrates a partial view of a handheld device including components of an image capture subsystem and depth sensing subsystem. As shown, the handheld device 10 is a smartphone that includes components that provide various functions. The handheld device 10 has a casing 12 that encloses various electronic components operable to carry out the various functions. The casing 12 is also a structural component by which outer-facing display elements, optics, sensors, and electronics are coupled to the rest of the handheld device 10. The casing 12 can be formed of molded plastic, lightweight metal alloy, or polymer, for example.

The handheld device 10 may include various fixtures such as screw holes and raised flat surfaces (not shown) to which sensors and other electronic components can be mounted. The assembly of sensors and other electronic components are mounted to the casing 12 via a frame (not shown in FIG. 1A) that is at least partially internal to the casing 12. One or more circuit boards (not shown) bearing electronic components (e.g., microprocessor, memory) of the handheld device 10 are mounted to the frame, and coupled to the sensors and other electronic components mounted to the casing 12. As such, electronic components such as a controller can operate the sensors and other electronic components mounted to the casing 12.

The sensors and other components mounted to the casing 12 can be part of various subsystems. Examples of the subsystems include an image capture subsystem and a depth sensing subsystem. The image capture subsystem can be a digital camera that includes a lens and other outward facing optic elements 14 ("camera optics 14") mounted to the casing 12. The digital camera can also include a camera illumination component 16 housing a visible light source 18. The camera illumination component 16 is separate and distinct from the camera optics 14. The visible light source 18 can illuminate a scene captured by the camera optics 14.

The depth sensing subsystem of the handheld device 10 includes a ToF sensor 20. The ToF sensor 20 includes a component operable to emit nonvisible light, which refers to light that is not in the visible portion of the light spectrum. The ToF sensor 20 also includes a component operable to capture the nonvisible light reflected off surfaces of objects in spatial relation to the ToF sensor 20. In particular, the ToF sensor 20 includes a nonvisible light source 22 ("depth light source 22") and a nonvisible light capture component 24 ("depth camera 24") that captures light from the depth light source 22 reflected off the surfaces of objects in an environment. The handheld device 10 may include other components such as a button 26 and other appurtenances not shown or further discussed herein for the sake of brevity. The camera optics 14, camera illumination component 16, and ToF sensor 20 are separate and distinct structures that occupy different locations of the casing 12. As a result, the casing 12 appears cluttered with different components of different subsystems.

Figure 1B:
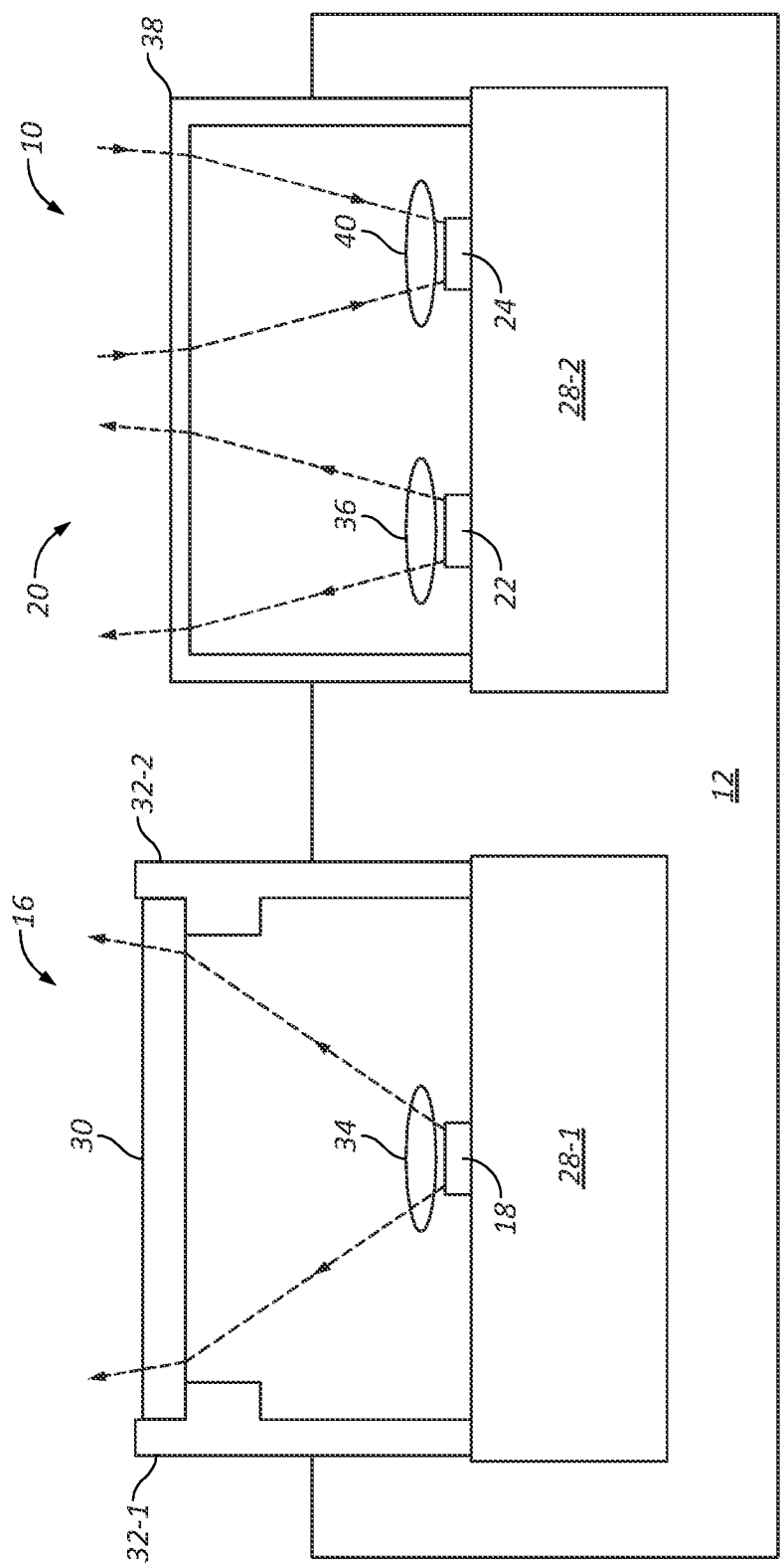
FIG. 1B illustrates a partial cross-sectional view of the handheld device of FIG. 1A including components of the image capture subsystem and the depth sensing subsystem.

FIG. 1B illustrates a partial cross-sectional view of the handheld device of FIG. 1A including components of the image capture subsystem and the depth sensing subsystem. As shown, the camera illumination component 16 and ToF sensor 20 are mounted to the casing 12 via portions of the frame 28-1 and 28-2, respectively. The camera illumination component 16 is formed of a transparent panel 30 supported by sidewalls 32-1 and 32-2. The transparent panel 30 may be formed of glass, plastic or any other transparent material that permits light to travel from the visible light source 18 housed in the camera illumination component 16 to an external environment. Although shown as an assembly of different structures, the camera illumination component may be formed of fewer or more combinations of structures that facilitate illuminating a scene with the visible light source 18. Visible light rays 34 are emitted by the visible light source through the transparent panel 30 and to an exterior environment including a scene to be captured. The properties of the transparent panel 30 may be such that the light rays 34 are dispersed to illuminate the scene.

The ToF sensor 20 includes the depth light source 22 that emits rays of light 36 that travel through a transparent panel 38 to an exterior environment. The depth camera 24 captures rays of light 40 reflected off surfaces of objects in the external environment that travel back through the transparent panel 38. Although the transparent panel 38 is shown as a single continuous structure mounted to the frame 28-2, and housing the depth light source 22 and depth camera 24, the transparent panel 28 may be formed of separate portions similar to the camera illumination panel 16. As shown, the components of the image capture subsystem and the depth sensing subsystem are separate and distinct structures that occupy different locations of the casing 12, which appears cluttered, and limits the ability to incorporate components of other subsystems on the casing 12.

The disclosed embodiments improve on existing technologies by integrating a visible light source of an image capture subsystem and depth sensing components into a single integrated, compact structure operable to independently, separately, and/or simultaneously illuminate a scene with visible light and/or take depth sensing measurements of the scene. Embodiments of the disclosed single integrated, compact structure can be incorporated into the casings of handheld devices to further provide a less cluttered appearance compared to existing handheld devices, while maintaining diverse functional features.

FIGS. 2A through 3B and related text describe certain embodiments of a single integrated, compact structure including components of an image capture subsystem and depth sensing subsystem in the context of handheld devices. However, the disclosure is not limited to handheld devices; instead, the disclosed technology has a variety of possible applications, including being incorporated into electronic devices for gaming systems, active cameras, and the like. All such applications, improvements, or modifications are considered within the scope of the concepts disclosed herein.

In particular, FIG. 2A illustrates a partial view of a handheld device including components of an image capture subsystem and depth sensing subsystem integrated in a single compact structure according to an embodiment of the present disclosure. The image capture subsystem may be a digital camera that includes a lens and other outward facing optic elements 44 ("camera optics 44") mounted on the casing 45. The digital camera can also include a visible light source 46. The depth sensing subsystem can include a depth light source 48 and depth camera 50. The handheld device 42 consolidates the visible light source 46 of an image capture subsystem, depth light source 48, and the depth camera 50 into an single integrated, compact structure 52 ("integrated structure 52"). The handheld device 42 can also include a button 54 and other appurtenances (not shown) or further discussed herein for the sake of brevity. As a result, the handheld device 42 has a reduced number of components mounted to the casing 45 compared to the handheld device 10. Hence, the integrated structure 52 reduces the complex and cluttered appearance of the casing 45 and/or facilitates mounting other components of subsystems to the casing 45.

The visible light source 46 may include any light emitting electronic component such as LEDs or any other semiconductor-based light source. Although shown as including only one visible light source 46, the integrated structure 52 can include any number of light sources (e.g., two or more LEDs) that can produce artificial light operable to illuminate an environment. In a camera application, an illuminated scene can be captured with the camera optics 44 of the image capture subsystem. For example, the visible light source 46 can produce a flash of light lasting 1/1000 to 1/200 of a second at a color temperature of about 5500K. In this context, the visible light source 46 is a "flash," which refers to an electronic component that discharges the flash of light. When operating as a flash, the visible light source 46 enables the camera optics 44 to capture a still or video image of an illuminated scene because the light emitted from the visible light source 46 is electromagnetic radiation that is typically part of the visible spectrum and suitable for illuminating the scene. The visible light source 46 may also function as a flashlight that can emit visible light continuously under the control of an application running on the handheld device 42.

These are only a few non-limiting examples of possible applications that can be implemented using the visible light source 46.

The depth light source 48 is operable to emit electromagnetic radiation suitable for depth sensing and should not directly interfere with the light emitted from the visible light source 46. As such, the light emitted from the depth light source 48 is typically not part of the visible spectrum. Examples of the emitted light include infrared (IR) light to make the illumination unobtrusive. The depth light source 48 may include LEDs such as super-luminescent LEDs, laser diodes, or any other semiconductor-based light source.

The light emitted by the depth light source 48 reflects off surfaces of objects in an environment and returns back to the depth camera 50. The depth camera 50 captures the reflected light that includes at least a portion of the light from the depth light source 48. The depth camera 50 includes an image sensor configured to capture light emitted by the depth light source 48. In some embodiments, the depth camera 50 includes a lens that gathers reflected light and images from the environment onto the image sensor. The depth camera 50 may be coupled to an optical bandpass filter used to pass only the light with the same wavelength as the light emitted by the depth light source 48. For example, in a depth sensing system, each pixel of the depth camera 50 may measure the time light has taken to travel from the depth light source 48 to surfaces of objects and back to the depth camera 50. Any of several various approaches known to persons skilled in the art could be used for determining the timing and corresponding depth calculations.

The handheld device 42 may include electronic circuitry (not shown in FIG. 2A) operable to coordinate, control, and/or synchronize the operations of the visible light source 46, the depth light source 48, and the depth camera 50, of the integrated structure 52, and operable to perform associated data processing functions. The circuitry may include, for example, one or more processors and one or more memory components. As a result, the handheld device 42 can capture images and provide surface reconstruction to model an environment, use the depth sensing subsystem to focus a digital camera, or be used as a sensor to receive human interaction information. For example, the handheld device 42 can render a three-dimensional view to provide a virtual or augmented reality experience. In other embodiments, the aforementioned components may be located in different locations on the handheld device 42. Additionally, some embodiments may omit some of the aforementioned components and/or may include additional components not discussed above nor shown in FIG. 2A.

FIG. 2B illustrates a cross-sectional view of the single integrated, compact structure of FIG. 2A including components of the image capture subsystem and the depth sensing subsystem according to an embodiment of the present disclosure. As shown, the integrated structure 52 is formed of a transparent panel 56 (i.e., transparent window) supported by sidewalls 58-1 and 58-2, which form a housing containing the visible light source 46, the depth light source 48, and the depth camera 50, which are each mounted on a frame 58. Hence, the visible light source 46, the depth light source 48, and the depth camera 50 are all under the same transparent window (i.e., transparent panel 56). The integrated structure 52 is mounted to the casing 45.

The transparent panel 56 may be formed of glass, plastic or any other material that is transparent to light. In particular, visible light 60 is emitted from the visible light source 46 through the transparent panel 56 to the external environment. Nonvisible light rays 62 are emitted from the depth light source 48 through the transparent panel 56 to the external environment. Lastly, nonvisible light rays 62, emitted from the depth light source 48, are reflected off surfaces of objects in the external environment, travel through the transparent panel 56, and are captured by the depth camera 50. Thus, the depth light source 48 emits light rays 62 that travel through a transparent panel 56 to an exterior environment, and the depth camera 50 captures rays of light 64 reflected off surfaces of objects in the external environment that travel back through the transparent panel 56.

In some embodiments, the transparent panel 56 may permit light from certain portions of the light spectrum to travel from an interior of the integrated structure 52 to the exterior environment. For example, the transparent panel 56 may permit light from visible and nonvisible portions of the light spectrum. The transparent panel 56 may permit light of certain portions of the light spectrum to travel from the exterior environment to the interior of the integrated structure 52. For example, the transparent panel 56 may permit only light from nonvisible portions of the spectrum to travel through the transparent panel 56 into the interior of the integrated structure 52. As such, the transparent panel 56 may permit different wavelengths of light to travel in different directions for certain applications.

In some embodiments, a portion 66 of the transparent panel 56 may include a diffuser optic operable to diffuse the light 60 received from the visible light source 46. As shown, the diffuser has two optical surfaces—to receive and output the light, respectively—which collectively act to diffuse the light 60 from the visible light source 46. As such, the light 60 that propagates through the diffuser is output in an illumination pattern that is diffused in comparison to the illumination pattern of the light 60 emitted from the visible light source 46. Although the diffuser optic is shown as integrated into the transparent panel 56 formed of molded acrylic, the disclosure is not so limited. Any suitably designed diffuser may be used to create a field of illumination desired for a particular application. For example, in some embodiments, a Fresnel lens can be included anywhere along the optical path of the light 60 to diffuse the light 60.

In some embodiments, any optical elements along the optical paths of light emitted from a light source has an index of refraction equal to an amount that permits all or a substantial amount of the light to emit to an exterior environment. In some embodiments, an optical element (e.g., lens) spans a size or area larger than the exit angle of light emitted from a light source. As such, the light emitted from a light source is not reflected off the side of the optical element.

For example, the portion 66 may span the area of the transparent panel 56 that receives the light emitted from the visible light source 46. As such, the light emitted from the visible light source 46 can be diffused to illuminate a larger portion of the exterior environment compared to using the transparent panel 56 alone. Although shown as an assembly of different structural components, the integrated structure 52 may be formed of fewer or more structural components, such as a single continuous transparent panel 56 that facilitates illuminating the external environment with light emitted from light sources contained therein, and receiving light via the depth camera 50.

In the illustrated embodiment, the light sources of the integrated structure 52 are positioned such that they emit light in outwardly divergent directions with respect to the depth camera 50. Moreover, the light sources 46 and 48 can have reduced fields of illumination and increased range from the depth camera 50. Hence, the light sources 46 and 48 are collectively configured to emit light in the handheld device 42's field of view, although some of the light may not be visible to the user. The locations and positions of the light sources 46 and 48 and the depth camera 50 relative to each other as shown in FIG. 2B are merely examples of a configuration used for image capturing and depth sensing; other configurations are possible in the context of the technique introduced herein.

The disclosed light sources 46 and 48 may emit light in accordance with an illumination pattern. The illumination pattern may have properties including divergence, beam quality, amplitude, and the like. For example, the illumination pattern of light emitted from the light sources 46 and 48 includes directions that are perpendicular or substantially perpendicular to the surface of the frame 58 on which the light sources 46 and 48 are mounted. A "substantially perpendicular" direction is a direction where a perpendicular component of the direction relative to a surface is greater than a parallel component of the direction relative to the surface.

Thus, components of the image capture subsystem and the depth sensing subsystem are integrated into a single compact structure that occupies a single location of the casing 45 and, as such, appears less cluttered and improves the ability to incorporate other components of subsystems on the casing 45 compared to the handheld device of FIGS. 1A and 1B. Accordingly, the disclosed embodiments overcome the drawbacks of existing technologies that are functionally limited and appear cluttered.

FIG. 3A illustrates a partial view of a handheld device including components of an image capture subsystem and depth sensing subsystem integrated in a single integrated compact structure according to another embodiment of the present disclosure. Similar to the handheld device 42 of FIG. 2A, the handheld device 68 includes components of an image capture subsystem and depth sensing subsystem mounted to a casing 70. The image capture subsystem includes camera optics 72 and a visible light source 74. The depth sensing subsystem includes a depth light source 78 and a depth camera 80 housed in the integrated structure 76. The visible light source 74, depth light source 78 and depth camera 80 are included in a single integrated, compact structure 76 ("integrated structure 76"). These components can be structurally and functionally similar to those shown in FIG. 2A and, as such, a similar description is not reproduced herein. Unlike the handheld device 42, the integrated structure 76 includes an additional optical element 82 that receives the light emitted by the depth light source 78.

Figure 3B:
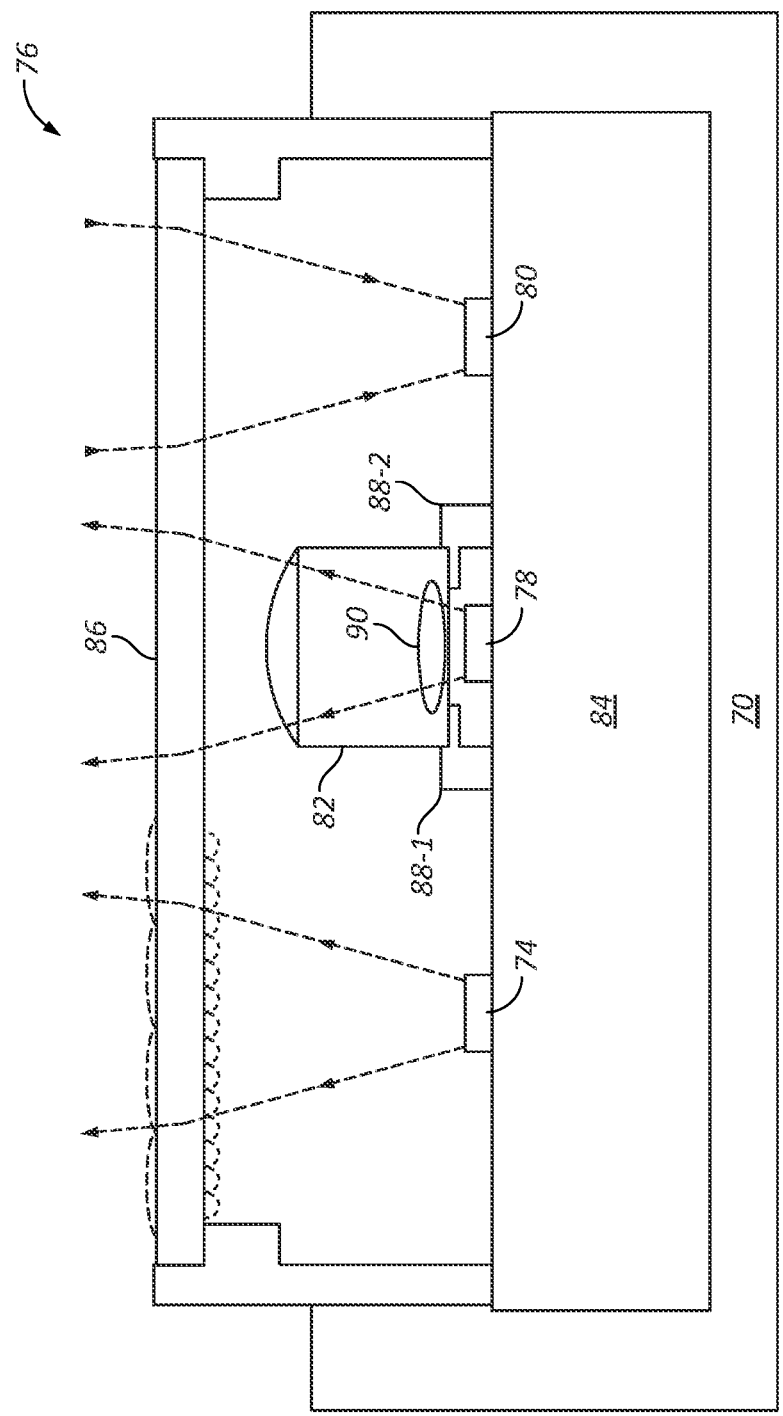
FIG. 3B illustrates a cross-sectional view of the single integrated, compact structure of FIG. 3A including components of an image capture subsystem and depth sensing subsystem according to another embodiment of the present disclosure.

FIG. 3B illustrates a cross-sectional view of the single integrated, compact structure of FIG. 3A including components of an image capture subsystem and depth sensing subsystem according to another embodiment of the present disclosure. The light emitted from the light sources 74 and 78 propagates away from the frame 84 on which the integrated structure 76 is mounted. For example, the light 90 emitted from the depth light source 78 propagates away from the frame 84. In some embodiments, light emitted from light source 74 or 78 has a desired pattern and direction. For example, the pattern of the light 90 emitted from the depth light source 78 has a direction that is substantially perpendicular to the surface of the frame 84. Lastly, light propagated towards the frame 84 can be captured by the depth camera 80 as described above.

In some embodiments, the optical element 82 may include one or more mirrors, lenses, prisms, and/or other components. Each optical element includes one or more optical surfaces that may input or output light emitted from the visible light source 72 and/or depth light source 78 as the light propagates through the integrated structure 76. Although only one additional optical element is shown, the integrated structure 76 may include multiple additional optical elements that are at least partially contained in the integrated structure 76. Moreover, the optical element may be integrated into the transparent panel 86 such that the transparent panel 86 is a complex single piece of transparent material that incorporates multiple optical features for different light sources. For example, the transparent panel 86 can have integrated therein a diffuser optic and a focusing optic in the paths of the light emitted from the light sources 74 and 78, respectively.

As shown, the optical element 82 is a focusing optic positioned in an optical path of the light 90 propagating towards the transparent panel 86. The optical element 82 is mounted to sidewalls 88-1 and 88-2 atop a frame 84 to support the optical element 82 over the depth light source 78. For example, the optical element 82 can be a parabolic lens or a collimation optic that can collimate all or some of the light 90. A first optical surface of the optical element 82 can refract light received from the depth light source 78, and a subsequent optical surface collimates the light 90 received from the first optical surface at the beginning of the optical path. Thus, the focusing optic has two optical surfaces to receive and output the light, respectively, and collectively focus the light 90. As such, the pattern of the light 90 that propagates through the integrated structure 76 is conditioned compared to the pattern of the light 90 emitted from the depth light source 78. To "condition" the light refers to changing the orientation of light rays relative to each other. For example, to condition light may affect divergence or convergence of light rays in order to collimate light.

Embodiments including optical elements are not limited to those shown in FIGS. 3A and 3B. For example, the optical element 82 can be a turning prism or turning reflector that can turn (e.g., reflect) propagating light from a light source in a different direction. In some embodiments, the turning reflector may include a flat or curved mirror. The light that propagates through the turning reflector is output in a pattern that is reflectively redirected compared to the light pattern of the light emitted from a light source. To "redirect" the light refers to changing the direction of the light. In some embodiments, optical elements are used to turn and/or steer light before it travels through a transparent panel 86 to an exterior environment.

In some embodiments, the integrated structure 76 may include any number of different types of optical elements arranged in any combination and/or order to achieve a desired light pattern by the light emitted from the light sources 74 or 78. In some embodiments, a group of optical elements can collectively form an optical assembly that includes multiple optical surfaces. As such, the light 90 emitted from the depth light source 78 can be conditioned and/or redirected to form a desired pattern. In some embodiments, a turning mirror could be placed in close proximity to the depth light source 78 to redirect a laser beam normal to a surface of the circuit board, followed by a collimation optic and diffuser. Accordingly, the integrated structure 76 may include any number and type of optical elements with suitable optical properties for particular applications.

Thus, the optical elements of an integrated structure can include any number or type of optical surfaces that collectively condition and redirect light emitted from a light source. For example, the optical surfaces can be at least partially contained within the integrated structure and are collectively configured to receive, condition, and redirect the light emitted from a light source. As a result, the integrated structure can output the conditioned and redirected light in an illumination pattern different from the illumination pattern of the light emitted from a light source.

The numbers, types, and ordered combinations of optical surfaces can vary from those shown in the Figures in accordance with the technique introduced herein. In certain embodiments, the integrated structure 76 includes more than two optical surfaces that input or output light, up to eight or ten optical surfaces, or combinations thereof. In some embodiments, different optical surfaces of the integrated structure 76 are configured to separately or collectively condition or redirect light. For example, three different optical surfaces of the integrated structure 76 may receive or output light, and separately focus, redirect, and diffuse the redirected light.

In some instances, embodiments of the integrated structures are of a suitable size to mount onto or into compact electronic devices such as handheld devices. For example, the integrated structure 76 may have dimensions measuring a few millimeters. As such, manufacturing the integrated structures involves assembly of relatively small components including light sources, optical elements, image capture components, and a casing all mounted to a frame.

The disclosed integrated structure enables assembly by a computer controlled transfer device of the type used for high speed, high precision placement of electronic components such as capacitors, resistors, and integrated circuits onto circuit boards for computers, consumer electronics, and the like. Examples of a computer controlled transfer device include pick-and-place machines (P&Ps). In some embodiments, for example, a semiconductor-based light source may be mounted to a circuit board by using chip-on-board (COB) techniques, and/or the individual optical elements may be mounted to the illumination module by using P&P techniques.

Figure 4:
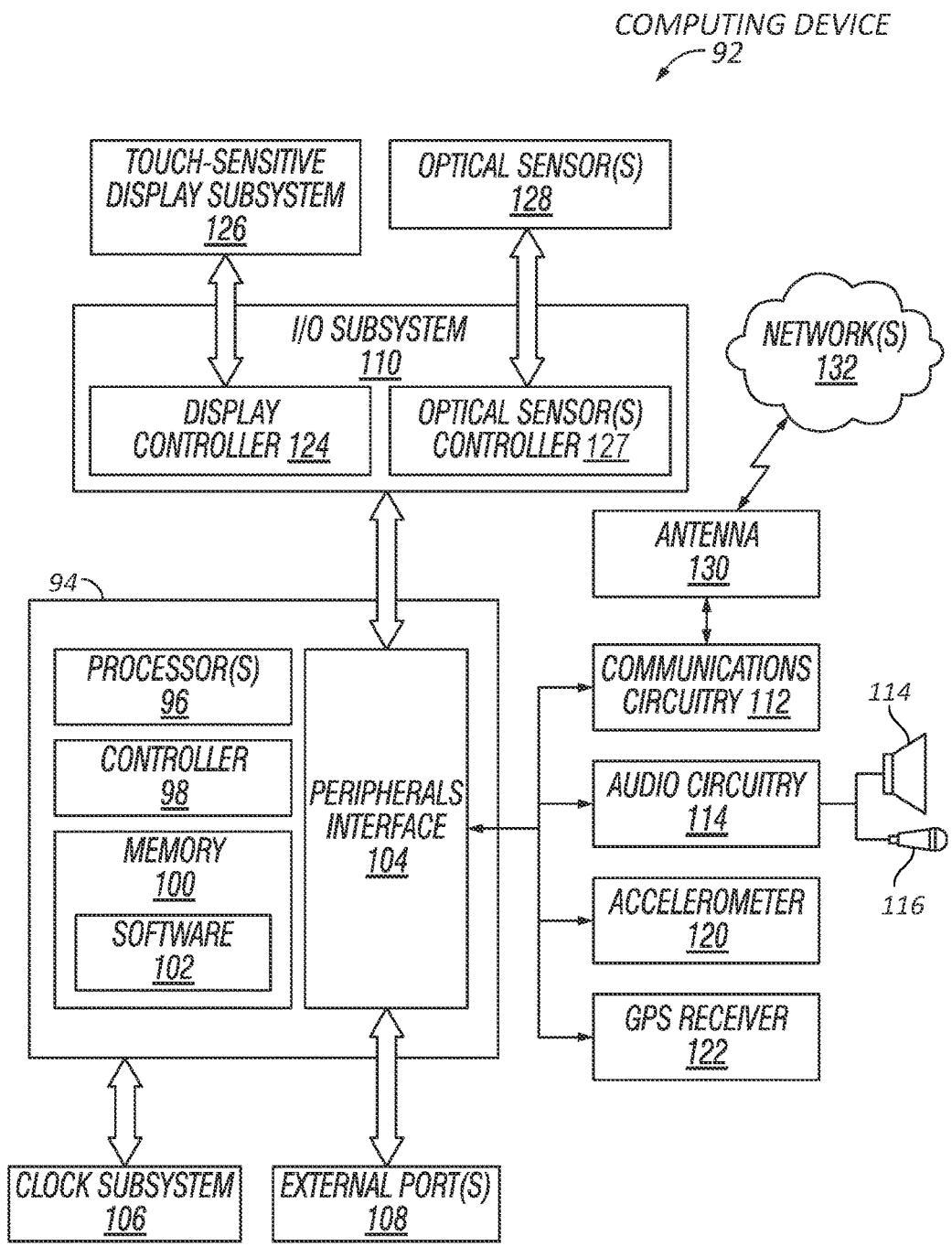
FIG. 4 is a block diagram illustrating components of the computing device in which embodiments of the present disclosure can be implemented according to some embodiments of the present disclosure.

FIG. 4 is a block diagram illustrating components of the computing device in which embodiments of the present disclosure can be implemented according to some embodiments of the present disclosure. The computing device 92 (e.g., handheld device) may include generic components and/or components specifically designed to carry out the disclosed technology. The computing device 92 may be a standalone device or part of a distributed system that spans networks, locations, machines, or combinations thereof. For example, components of the computing device 92 may be included in or coupled to a system-on-chip (SOC), a single-board computer (SBC) system, a desktop or laptop computer, a kiosk, a mainframe, a mesh of computer systems, or combinations thereof.

In some embodiments, the computing device 92 can operate as a server device or a client device in a client-server network environment, or as a peer machine in a peer-to-peer system. In some embodiments, the computing device 92 may perform one or more steps of the disclosed embodiments in real-time, near real-time, offline, by batch processing, or combinations thereof.

The computing device 92 includes a processing subsystem 94 that includes one or more processor(s) 96 (e.g., Central Processing Units (CPUs), Application Specific Integrated Circuits (ASICs), and/or Field Programmable Gate Arrays (FPGAs)), a memory controller 98, memory 100 that can store software 102, and a peripherals interface 104. The memory 100 may include volatile memory (e.g., random-access memory (RAM)) and/or non-volatile memory (e.g., read-only memory (ROM)). The memory 100 can be local, remote, or distributed. The computing device 92 can also include a clock subsystem 106 that controls a timer for use in some embodiments. The components of the computing device 92 are interconnected over a bus (not shown) operable to transfer data between hardware components.

The peripherals interface 104 is coupled to one or more external port(s) 108, which can connect to an external power source, for example. The peripherals interface 104 is also coupled to an I/O subsystem 110. Other components coupled to the peripherals interface 104 include communications circuitry 112, audio circuitry 114 for a speaker 116 and a microphone 118, an accelerometer 120, a GPS receiver 122 (or Global Navigation Satellite System (GLONASS) or other global navigation system receiver), and other sensors (not shown). The GPS receiver 122 is operable to receive signals concerning the geographic location of the computing device 92. The accelerometer 120 can be operable to obtain information concerning the orientation (e.g., portrait or landscape) of computing device 92.

The I/O subsystem 110 includes a display controller 124 operable to control a touch-sensitive display subsystem 126, which further includes the touch-sensitive display of the computing device 92. The I/O subsystem 110 also includes an optical sensor(s) controller 127 for one or more optical sensor(s) 128 of the computing device 92. The I/O subsystem 110 includes other components (not shown) to control physical buttons, such a "home" button.

The communications circuitry 112 can configure or reconfigure the antenna 130 of the handheld device. In some embodiments, the antenna 130 can be structurally integrated with the computing device 92 (e.g., embedded in the housing or display screen) or, for example, coupled to the computing device 92 through the external port(s) 108. The communications circuitry 112 can convert electrical signals to/from electromagnetic signals that are communicated by the antenna 130 to network(s) 132 or other devices. For example, the communications circuitry 112 can include radio frequency (RF) circuitry that processes RF signals communicated by the antenna 130.

In some embodiments, the antenna 130 can be programmatically controlled via the communications circuitry 112. For example, the software 102 may control or contribute to the configuration of the antenna 130 via the communications circuitry 112. For example, the memory 100 may include a database used by the software 102 to configure (or reconfigure) the communications circuitry 112 or antenna 130. The software 102 can be located anywhere in the computing device 92 or located remotely and communicatively coupled over a network to the computing device 92. For example, the software 102 can be in a memory 100 to remotely configure the communications circuitry 112 and/or the antenna 130.

As indicated above, in some embodiments, the configuration of antenna 130 can be separately or collectively addressable by the communications circuitry. The communications circuitry 112 can selectively activate, deactivate, or actively switch any combination of the antenna components to achieve a desired antenna and/or behavior. For example, in the illustrated embodiment, some of the antenna 130, connectors, and interconnectors are active, while others are not. The active elements form the antenna 130 for transmitting and/or receiving wireless communication signals.

For example, the antenna 130 can operate as a collection of diversity elements for a diversity antenna under the control of the communications circuitry 112 to perform automatic switching of the plurality of diversity elements based on the estimated geographic location of the handheld device. In another example, a combination of antenna elements can be activated to form omnidirectional, directional (e.g., Yagi), or many other types of antennas known to persons skilled in the art and not described herein for brevity. Further, for example, a particular combination of antenna elements can be activated to adjust for an impedance value, to tune for a particular resonant frequency, to match an antenna load, to operate in accordance with a particular protocol, etc. In some embodiments, a feedback loop (not shown) could be used to configure (or reconfigure) the combination of active antenna components (e.g., based on a signal strength).

The communications circuitry 112 can include circuitry for performing well-known functions such as an RF transceiver, one or more amplifiers, a tuner, oscillator, a digital signal processor, a CODEC chipset, a subscriber identity module (SIM card or eSIM), and so forth. The communications circuitry 112 may communicate wirelessly via the antenna 130 with the network(s) 132 (e.g., the Internet, an intranet and/or a wireless network, such as a cellular network, a wireless local area network (LAN) and/or a metropolitan area network (MAN)) or other devices.

The software 102 can include an operating system (OS) software program, application software programs, and/or modules such as a communications module, a GPS module, and the like. For example, the GPS module can estimate the location of the computing device 92 based on the GPS signals received by the GPS receiver 122. The GPS module can provide this information to components of the computing device 92 for use in various applications (e.g., to provide location-based access to service providers).

A software program, when referred to as "implemented in a computer-readable storage medium," includes computer-readable instructions stored in the memory (e.g., memory 100). A processor (e.g., processor(s) 96) is "configured to execute a software program" when at least one value associated with the software program is stored in a register that is readable by the processor. In some embodiments, routines executed to implement the disclosed embodiments may be implemented as part of OS software (e.g., Microsoft Windows® and Linux®) or a specific software application, component, program, object, module, or sequence of instructions referred to as "computer programs."

Computer programs typically comprise one or more instructions set at various times in various memory devices of a computing device (e.g., computing device 92), which, when read and executed by at least one processor (e.g., processor(s) 96), will cause the computing device 92 to execute functions involving the disclosed embodiments. In some embodiments, a carrier containing the aforementioned computer program product is provided. The carrier is one of an electronic signal, an optical signal, a radio signal, or a non-transitory computer-readable storage medium (e.g., the memory 100).

Operation of a memory device (e.g., memory 100), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

The computing device 92 may include other components that are not shown nor further discussed herein for the sake of brevity. One having ordinary skill in the art will understand any hardware and software that is included but not shown in FIG. 4. While embodiments have been described in the context of fully functioning handheld devices, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A handheld device comprising:
   an image capture subsystem comprising:
      an image capture light source operable to emit visible light; and
      an image capture camera operable to capture an image of a scene illuminated by the visible light emitted by the image capture light source;
   a depth sensing subsystem comprising:
      a depth light source operable to emit infrared light; and
      a depth camera operable to capture reflected infrared light after reflecting off objects in the scene, the reflected infrared light including at least some of the infrared light emitted from the depth light source;
   wherein the image capture light source, the depth light source, and the depth camera are housed in a single integrated structure including a single transparent panel through which the visible light and the infrared light are propagated onto the scene, and through which the depth camera receives the reflected infrared light propagated from the scene.

2. The handheld device of claim 1, wherein the handheld device is a mobile phone.

3. The handheld device of claim 2, wherein the mobile phone has an outer casing supporting the single integrated structure, and the image capture light source, the depth light source, and the depth camera faces away from the casing.

4. The handheld device of claim 1, wherein the depth sensing subsystem comprises a time-of-flight sensor including the depth light source and the depth camera.

5. The handheld device of claim 1, comprising:
   a diffuser optic positioned in an optical path of the visible light emitted by the image capture light source, the diffuser optic being configured to diffuse the visible light emitted by the image capture light source onto the scene.

6. The handheld device of claim 5, wherein the single transparent panel is a molded acrylic and the diffuser optic is incorporated in the single transparent panel.

7. The handheld device of claim 5, wherein the diffuser optic is a Fresnel lens.

8. The handheld device of claim 1, wherein the image capture light source and the depth light source are semiconductor-based light sources.

9. The handheld device of claim 1, wherein the image capture light source includes a light emitting diode.

10. The handheld device of claim 1, wherein the depth light source includes a super-luminescent light emitting diode or laser diode.

11. The handheld device of claim 1, comprising:
a focusing optic positioned in an optical path of the infrared light emitted by the depth light source, the focusing optic being configured to focus the infrared light emitted by the depth light source onto the scene.

12. The handheld device of claim 11, wherein the focusing optic is a collimation optic configured to collimate the infrared light emitted by the depth light source onto the scene.

13. The handheld device of claim 11, wherein the focusing optic is a parabolic lens.

14. A single integrated structure including components of an image capture subsystem and a depth sensing subsystem comprising:
a first light source component operable to emit light of a first wavelength through a transparent window;
a second light source component operable to emit light of a second wavelength through the transparent window, the second wavelength being different from the first wavelength; and
a camera component operable to capture light through the transparent window, wherein the camera component is operable to capture light of the second wavelength but not the first wavelength.

15. The single integrated structure of claim 14, wherein the image capture subsystem includes the first light source component, and the depth sensing subsystem includes the second light source component and the camera component.

16. The single integrated structure of claim 14, wherein the first wavelength corresponds to a visible portion of a light spectrum, and the second wavelength corresponds to an infrared portion of the light spectrum.

17. The single integrated structure of claim 14, comprising:
a first optic positioned in an optical path of the light of the first wavelength, the first optic being configured to diffuse the light of the first wavelength; and
a second optic positioned in an optical path of the light of the second wavelength, the second optic being configured to focus the light of the second wavelength.

18. The single integrated structure of claim 17, wherein the first optic is a Fresnel lens and the second optic is a parabolic lens.

19. The single integrated structure of claim 14, wherein the first light source component and the second light source component are semiconductor-based light sources.

20. A handheld device comprising:
a single integrated structure at least partially embedded in a casing of the handheld device, the single integrated structure including:
a light emitting diode operable to emit visible light through a transparent window;
a diffuser optic positioned in an optical path of the visible light emitted by the light emitting diode, the diffuser optic being configured to diffuse the visible light emitted by the light emitting diode through the transparent window and onto a scene;
a laser emitting diode operable to emit infrared laser light through the transparent window;
a focusing optic positioned in an optical path of the infrared laser light emitted by the laser emitting diode, the focusing optic being configured to focus the infrared laser light emitted by the laser emitting diode through the transparent window and onto the scene; and
a camera operable to capture reflected infrared laser light after reflecting off objects in the scene, the reflected infrared laser light including at least some of the infrared laser light emitted from the laser emitting diode and focused by the focusing optic.

* * * * *